(12) United States Patent
Tamatani et al.

(10) Patent No.: US 12,131,871 B2
(45) Date of Patent: Oct. 29, 2024

(54) ELECTRONIC COMPONENT AND METHOD FOR MANUFACTURING ELECTRONIC COMPONENT

(71) Applicant: Murata Manufacturing Co., Ltd., Nagaokakyo (JP)

(72) Inventors: Yasuhiro Tamatani, Nagaokakyo (JP); Kazuya Kusuda, Nagaokakyo (JP); Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 127 days.

(21) Appl. No.: 17/412,410

(22) Filed: Aug. 26, 2021

(65) Prior Publication Data

US 2021/0383976 A1 Dec. 9, 2021

Related U.S. Application Data

(63) Continuation of application No. PCT/JP2019/050306, filed on Dec. 23, 2019.

(30) Foreign Application Priority Data

Feb. 28, 2019 (JP) ................................. 2019-035919

(51) Int. Cl.
*H01G 4/38* (2006.01)
*H01G 4/012* (2006.01)
(Continued)

(52) U.S. Cl.
CPC ............. *H01G 4/385* (2013.01); *H01G 4/012* (2013.01); *H01G 4/224* (2013.01);
(Continued)

(58) Field of Classification Search
CPC ...... H01G 4/012; H01G 4/224; H01G 4/2325; H01G 4/30; H01G 4/385; B05D 1/26; B05D 1/32; B05D 5/12
(Continued)

(56) References Cited

U.S. PATENT DOCUMENTS 5,389,148 A * 2/1995 Matsunaga ........... B05B 7/2483
118/301
6,135,024 A * 10/2000 Higashida ............... B41F 15/40
118/413
(Continued)

FOREIGN PATENT DOCUMENTS

CN 104576051 A 4/2015
JP 2009253010 A 10/2009
(Continued)

OTHER PUBLICATIONS

Written Opinion of the International Searching Authority issued for PCT/JP2019/050306, date of mailing Mar. 17, 2020.
(Continued)

*Primary Examiner* — Brian K Talbot
(74) *Attorney, Agent, or Firm* — ArentFox Schiff LLP

(57) ABSTRACT

An electronic component that includes an electronic component body including a first internal electrode exposed at a first end surface and a second internal electrode exposed at a second end surface; a first external electrode on the first end surface and a bottom surface of the electronic component body; and a second external electrode on the second end surface and the bottom surface of the electronic component body, wherein the first external electrode comprises a first end surface electrode and a first bottom surface electrode that are integrated, and a thickness of the first end surface electrode is smaller than a thickness of the first bottom surface electrode, and the second external electrode comprises a second end surface electrode and a second bottom (Continued)

surface electrode that are integrated, and a thickness of the second end surface electrode is smaller than a thickness of the second bottom surface electrode.

8 Claims, 8 Drawing Sheets

(51) Int. Cl.
*H01G 4/224* (2006.01)
*H01G 4/232* (2006.01)
*H01G 4/248* (2006.01)
*H01G 4/30* (2006.01)
*B01D 1/26* (2006.01)
*B05D 1/32* (2006.01)
*B05D 5/12* (2006.01)

(52) U.S. Cl.
CPC .......... *H01G 4/2325* (2013.01); *H01G 4/248* (2013.01); *H01G 4/30* (2013.01); *B01D 1/26* (2013.01); *B05D 1/32* (2013.01); *B05D 5/12* (2013.01)

(58) Field of Classification Search
USPC ...................................................... 427/79–81
See application file for complete search history.

(56) References Cited

U.S. PATENT DOCUMENTS

| | | | | |
|---|---|---|---|---|
| 6,138,562 A * | 10/2000 | Hertz | ................... | B23K 1/085 |
| | | | | 101/114 |
| 7,836,824 B2 * | 11/2010 | Mizuno | ............... | H05K 3/1216 |
| | | | | 101/126 |
| 9,667,174 B2 * | 5/2017 | Nishisaka | ............... | H02N 2/00 |
| 9,892,855 B2 * | 2/2018 | Ando | ................... | H01G 4/248 |
| 10,818,431 B2 * | 10/2020 | Onodera | ............... | H05K 1/181 |
| 10,998,117 B2 * | 5/2021 | Kobayashi | ............. | H01F 41/06 |
| 11,107,632 B2 * | 8/2021 | Sakurai | ................... | H01G 4/232 |
| 2001/0029852 A1 * | 10/2001 | Miyahara | ............... | B41F 15/46 |
| | | | | 101/129 |
| 2007/0158621 A1 * | 7/2007 | Sakamoto | ............. | H05K 1/092 |
| | | | | 252/500 |
| 2008/0196608 A1 * | 8/2008 | Ojima | ................... | B41N 1/248 |
| | | | | 101/127 |
| 2009/0284896 A1 | 11/2009 | Sakaguchi et al. | | |
| 2010/0182735 A1 | 7/2010 | Marek et al. | | |
| 2011/0226403 A1 | 9/2011 | Sakaguchi et al. | | |
| 2012/0019981 A1 * | 1/2012 | Yoshida | ................ | H01F 27/292 |
| | | | | 361/321.1 |
| 2013/0092721 A1 * | 4/2013 | Trelford | ................... | B05D 1/32 |
| | | | | 228/256 |
| 2013/0139711 A1 * | 6/2013 | Clarke | ................... | B41F 15/44 |
| | | | | 101/123 |
| 2014/0174309 A1 * | 6/2014 | Mohd Shapee | ...... | H05K 3/1233 |
| | | | | 101/129 |
| 2014/0285947 A1 * | 9/2014 | Suga | ................... | H01G 4/232 |
| | | | | 361/301.4 |
| 2015/0129641 A1 * | 5/2015 | Kuroda | ................ | B23K 1/0016 |
| | | | | 228/41 |
| 2015/0364261 A1 * | 12/2015 | Takahashi | ............ | H05K 3/3442 |
| | | | | 361/301.4 |
| 2016/0005539 A1 * | 1/2016 | Lee | ........................ | H01G 4/232 |
| | | | | 156/89.12 |
| 2016/0059542 A1 * | 3/2016 | Uchida | ................... | B41F 15/42 |
| | | | | 101/129 |
| 2016/0128244 A1 * | 5/2016 | Sawada | ................. | H01G 4/232 |
| | | | | 206/714 |
| 2016/0189866 A1 | 6/2016 | Kitamura et al. | | |
| 2018/0219111 A1 * | 8/2018 | Tsukigata | ................ | B41F 15/12 |
| 2019/0027312 A1 * | 1/2019 | Muramatsu | .............. | H01G 4/12 |
| 2019/0272955 A1 * | 9/2019 | Oh | ........................ | H01G 4/2325 |
| 2019/0287720 A1 * | 9/2019 | Mori | ........................ | H01G 4/12 |
| 2019/0378655 A1 * | 12/2019 | Iwai | ........................ | H01G 4/248 |
| 2020/0135401 A1 * | 4/2020 | Shin | ........................ | H01G 4/30 |

FOREIGN PATENT DOCUMENTS

| | | |
|---|---|---|
| JP | 2010147430 A | 7/2010 |
| JP | 2010171423 A | 8/2010 |
| JP | 2018082008 A | 5/2018 |
| WO | 2015037394 A1 | 3/2015 |

OTHER PUBLICATIONS

International Search Report issued for PCT/JP2019/050306, date of mailing Mar. 17, 2020.

* cited by examiner

Cross-sectional view taken along line A-A

ELECTRONIC COMPONENT AND METHOD FOR MANUFACTURING ELECTRONIC COMPONENT

CROSS REFERENCE TO RELATED APPLICATIONS

The present application is a continuation of International application No. PCT/JP2019/050306, filed Dec. 23, 2019, which claims priority to Japanese Patent Application No. 2019-035919, filed Feb. 28, 2019, the entire contents of each of which are incorporated herein by reference.

FIELD OF THE INVENTION

The present invention relates to an electronic component and a method of producing an electronic component.

BACKGROUND OF THE INVENTION

Electronic components include one in which external electrodes are provided on an electronic component body including internal electrodes. Examples of such an electronic component include multilayer ceramic capacitors and electrolytic capacitors.

Patent Literature 1 discloses a method of producing a multilayer capacitor. According to Patent Literature 1, a conductive paste is transferred to or printed on first and second side surfaces of a cuboid body to form a first terminal. Third and fourth side surfaces adjacent to the first and second side surfaces are immersed in the conductive paste to form a second terminal.

Patent Literature 2 discloses a multilayer ceramic electronic component. According to Patent Literature 2, a conductive paste for extension parts is printed by screen printing, gravure printing, or the like on a main surface of a stack which defines a main surface of a multilayer ceramic body, and the conductive paste is dried, whereby the extension parts are formed. Then, routing parts are formed by immersion coating.

Patent Literature 1: JP 2010-147430 A
Patent Literature 2: JP 2009-253010 A

SUMMARY OF THE INVENTION

In Patent Literature 1, the two steps, i.e., transfer or printing of the conductive paste and immersion in the conductive paste, are separately performed to form terminal electrodes. In Patent Literature 2, the extension parts are formed by printing, and the routing parts are formed by immersion. In other words, in both Patent Literature 1 and Patent Literature 2, the two steps, i.e., printing and immersion, are separately performed to form external electrodes. In this case, drying of the conductive paste is required before proceeding to the subsequent step, which results in formation of interfaces within the external electrodes, thus causing interfacial resistance and increasing the ESR of the external electrodes. Separately performing the two steps (printing and immersion) makes the process complicated and reduces the productivity.

Thus, the present invention aims to provide an electronic component including external electrodes having a low ESR and to provide a method of producing an electronic component by which external electrodes can be easily formed.

An electronic component of the present invention includes: an electronic component body including a first internal electrode exposed at a first end surface of the electronic component body and a second internal electrode exposed at a second end surface of the electronic component body; a first external electrode on the first end surface and a bottom surface of the electronic component body and electrically connected to the first internal electrode exposed at the first end surface; and a second external electrode on the second end surface and the bottom surface of the electronic component body and electrically connected to the second internal electrode exposed at the second end surface, wherein the first external electrode comprises a first end surface electrode on the first end surface and a first bottom surface electrode on the bottom surface that are integrated with each other, and a thickness of the first end surface electrode is smaller than a thickness of the first bottom surface electrode, and the second external electrode comprises a second end surface electrode on the second end surface and a second bottom surface electrode on the bottom surface that are integrated with each other, and a thickness of the second end surface electrode is smaller than a thickness of the second bottom surface electrode.

A first aspect of a method of producing an electronic component of the present invention includes: preparing an electronic component body including a first internal electrode exposed at a first end surface of the electronic component body and a second internal electrode exposed at a second end surface of the electronic component body; screen printing an electrode paste on the first end surface and a bottom surface of the electronic component body to form a first end surface electrode on the first end surface and a first bottom surface electrode on the bottom surface of the electronic component body such that a thickness of the first end surface electrode is smaller than a thickness of the first bottom surface electrode; and screen printing the electrode paste on the second end surface and the bottom surface of the electronic component body to form a second end surface electrode on the second end surface and a second bottom surface electrode on the bottom surface of the electronic component body such that a thickness of the second end surface electrode is smaller than a thickness of the second bottom surface electrode.

A second aspect of the method of producing an electronic component of the present invention includes: preparing an electronic component body including a first internal electrode exposed at a first end surface of the electronic component body and a second internal electrode exposed at a second end surface of the electronic component body; screen printing an electrode paste on a first end surface of the electronic component body and simultaneously applying the electrode paste to a bottom surface of the electronic component body such that a first end surface electrode formed on the first end surface is integrated with a first bottom surface electrode formed on the bottom surface and a thickness of the first end surface electrode is smaller than a thickness of the first bottom surface electrode; and screen printing the electrode paste on a second end surface of the electronic component body and simultaneously applying the electrode paste to the bottom surface of the electronic component body such that a second end surface electrode formed on the second end surface is integrated with a second bottom surface electrode formed on the bottom surface and a thickness of the second end surface electrode is smaller than a thickness of the second bottom surface electrode.

According to the present invention, the electrodes on the end surface and the bottom surface of the electronic component body are integrated with each other to form an external electrode. This prevents formation of an interface between the external electrode on the end surface and the external electrode on the bottom surface, which can prevent interfacial resistance resulting from such an interface. Thus, such an external electrode can have a lower ESR. In addition, when the electrode thickness on the end surface is smaller than the electrode thickness on the bottom surface, the resulting electronic component can have higher dimensional accuracy. The present invention also provides a method of producing an electronic component by which external electrodes can be easily formed.

DETAILED DESCRIPTION OF THE PREFERRED EMBODIMENTS

The following describes an electronic component and a method of producing an electronic component of the present invention. The present invention is not limited to the following preferred embodiments, and may be suitably modified without departing from the gist of the present invention. Combinations of two or more preferred features described in the following preferred embodiments are also within the scope of the present invention.

Examples of the electronic component of the present invention include electrolytic capacitors and multilayer ceramic electronic components. First, an electrolytic capacitor is described as an example of the electronic component of the present invention. Preferably, in the electrolytic capacitor as the electronic component of the present invention, an electronic component body includes a cuboid resin molding including internal electrodes. Preferably, the electronic component body includes a cuboid resin molding including a stack of capacitor elements and a sealing resin sealing the stack, each capacitor element including an anode having a dielectric layer on a surface thereof and a cathode opposite to the anode, the anode and the cathode being the internal electrodes.

Figure 1:
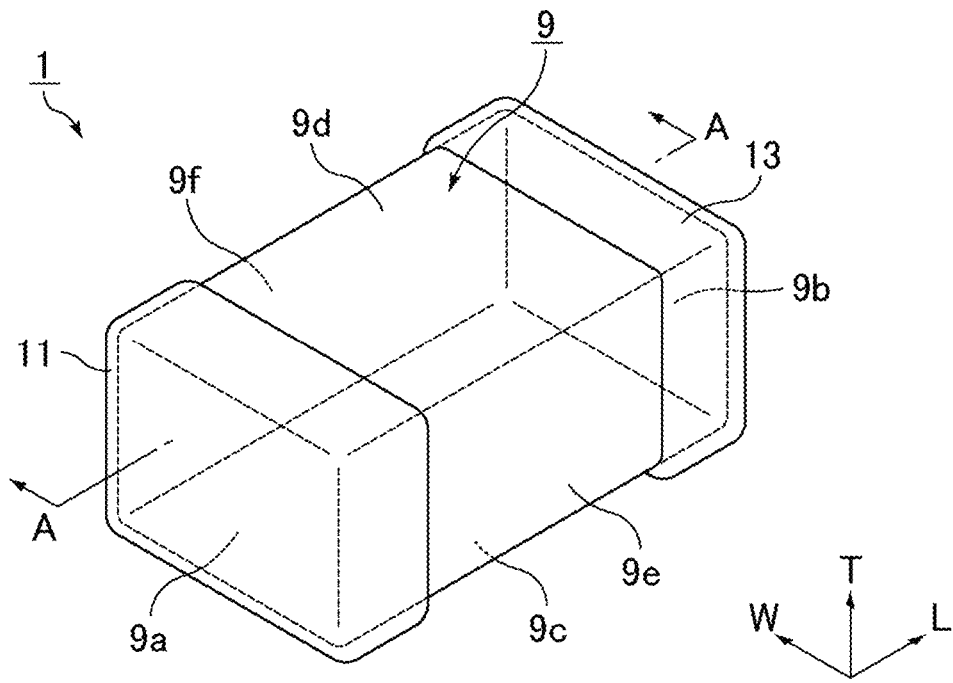
FIG. 1 is a schematic perspective view of an example of an electrolytic capacitor of a first embodiment.

An electrolytic capacitor of an embodiment described below is referred to as an electrolytic capacitor of a first embodiment. FIG. 1 is a schematic perspective view of an example of the electrolytic capacitor of the first embodiment. FIG. 1 shows a cuboid resin molding 9 defining an electrolytic capacitor 1. The resin molding 9 corresponds to an electronic component body. The resin molding 9 has a length direction (L direction), a width direction (W direction), and a thickness direction (T direction), and includes a first end surface 9a and a second end surface 9b which are opposite to each other in the length direction. The resin molding 9 includes a bottom surface 9c and a top surface 9d which are opposite to each other in the thickness direction. The bottom surface 9c is a surface on the side that serves as a mounting surface of the electrolytic capacitor 1. The resin molding 9 also includes a first side surface 9e and a second side surface 9f which are opposite to each other in the width direction.

A first external electrode 11 is provided in an integrated manner on the first end surface 9a and the bottom surface 9c. In the electrolytic capacitor 1 shown in FIG. 1, the first external electrode 11 is further provided in an integrated manner on the top surface 9d, the first side surface 9e, and the second side surface 9f. A second external electrode 13 is provided in an integrated manner on the second end surface 9b and the bottom surface 9c. In the electrolytic capacitor 1 shown in FIG. 1, the second external electrode 13 is further provided in an integrated manner on the top surface 9d, the first side surface 9e, and the second side surface 9f.

Herein, in each of the electronic component, electrolytic capacitor, and resin molding, as well as a multilayer ceramic electronic component and a stack (described later), a plane along the length direction (L direction) and the thickness direction (T direction) is referred to as an LT plane, a plane along the length direction (L direction) and the width direction (W direction) is referred to as an LW plane, and a plane along the thickness direction (T direction) and the width direction (W direction) is referred to as a WT plane.

Figure 2:
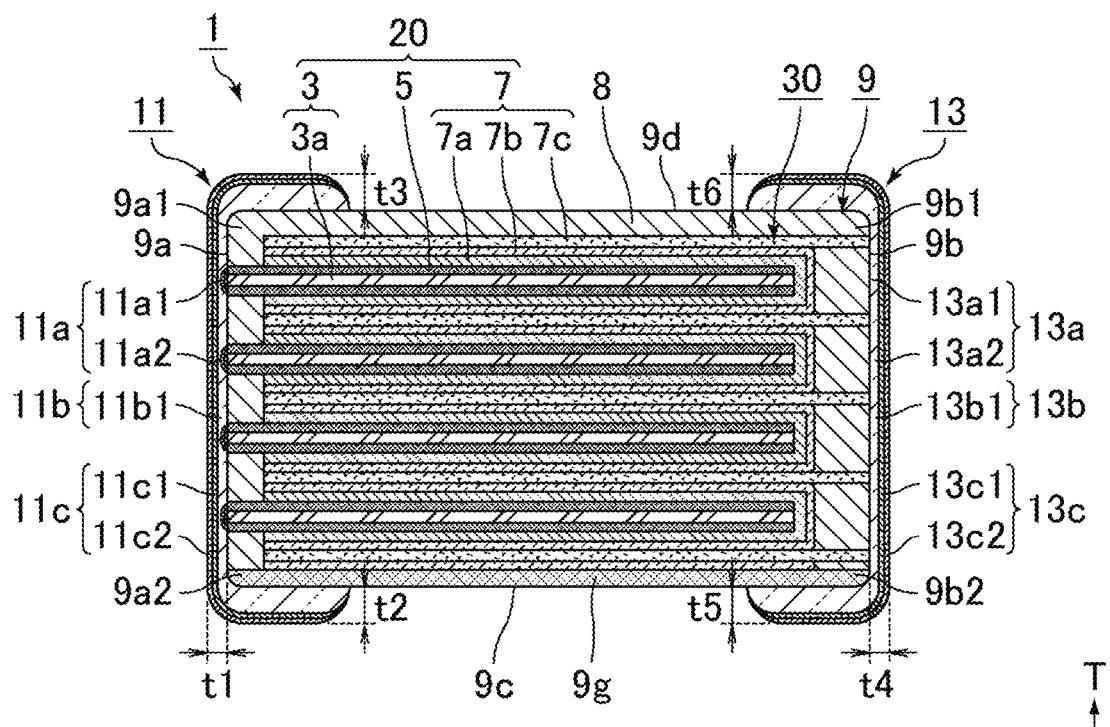
FIG. 2 is a cross-sectional view taken along line A-A of the electrolytic capacitor shown in FIG. 1.

FIG. 2 is a cross-sectional view taken along line A-A of the electrolytic capacitor shown in FIG. 1. The capacitor element 20 includes an anode 3 having a dielectric layer 5 on a surface thereof and a cathode 7 opposite to the anode 3. Multiple such capacitor elements 20 are stacked to form a stack 30, and the stack 30 is sealed with a sealing resin 8 to obtain the resin molding 9. In the stack 30, the stacked capacitor elements 20 may be bonded to each other via a conductive adhesive (not shown). The first external electrode 11 is on the first end surface 9a of the resin molding 9, and the first external electrode 11 is electrically connected to the anode 3 exposed at the first end surface 9a. The second external electrode 13 is on the second end surface 9b of the resin molding 9, and the second external electrode 13 is electrically connected to the cathode 7 exposed at the second end surface 9b.

The anode 3 defining the capacitor element 20 includes a valve-action metal foil 3a at a center thereof and a porous layer such as an etched layer (not shown) on a surface thereof. The dielectric layer 5 is provided on a surface of the porous layer.

Examples of the valve-action metal include elemental metals such as aluminum, tantalum, niobium, titanium, zirconium, magnesium, and silicon, and alloys containing these metals. Of these, aluminum and an aluminum alloy are preferred.

The valve-action metal may have any shape, but it is preferably flat, and is more preferably in the form of foil. Preferably, the porous layer is an etched layer that has been etched with hydrochloric acid or the like. The thickness of the valve-action metal foil before etching is preferably 60 µm to 180 µm. The thickness of the non-etched valve-action metal foil (core) after etching is preferably 10 µm to 70 µm. The thickness of the porous layer is designed according to the withstand voltage and capacitance required for the electrolytic capacitor, but the thickness of the porous layer including the porous layers on both sides of the valve-action metal foil is preferably 10 µm to 120 µm.

The anode 3 is led out to the first end surface 9a of the resin molding 9 and electrically connected to the first external electrode 11.

Preferably, the dielectric layer is formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed. The dielectric layer is formed along the surface of the porous layer, whereby pores (recesses) are formed in the dielectric layer. The thickness of the dielectric layer is designed according to the withstand voltage and capacitance required for the electrolytic capacitor, but the thickness of the dielectric layer is preferably 10 nm to 100 nm.

The cathode 7 of the capacitor element 20 is a stack including a solid electrolyte layer 7a on the dielectric layer 5, a conductive layer 7b on the solid electrolyte layer 7a, and a cathode lead-out layer 7c on the conductive layer 7b. The electrolytic capacitor of the present embodiment including a solid electrolyte layer as part of the cathode is considered to be a solid electrolytic capacitor.

Examples of materials defining the solid electrolyte layer include conductive polymers having a skeleton of pyrrole, thiophene, aniline, or the like. A conductive polymer having a thiophene skeleton is, for example, poly(3,4-ethylenedioxythiophene) (PEDOT), or may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on a surface of the dielectric layer using a treatment liquid containing a monomer such as 3,4-ethylenedioxythiophene or a method in which a dispersion of a polymer such as poly(3,4-ethylenedioxythiophene) is applied to a surface of the dielectric layer and dried. Preferably, a solid electrolyte layer for an inner layer for filling the pores (recesses) is formed first, and then a solid electrolyte layer for an outer layer for covering the entire dielectric layer is formed. The solid electrolyte layer can be formed in a predetermined region by applying the treatment liquid or dispersion to the dielectric layer by, for example, sponge transfer, screen printing, spray coating, dispensing, or inkjet printing. The thickness of the solid electrolyte layer is preferably 2 µm to 20 µm.

The conductive layer is provided to electrically and mechanically connect the solid electrolyte layer to the cathode lead-out layer. For example, the conductive layer is preferably a carbon layer, a graphene layer, or a silver layer formed by applying a conductive paste such as a carbon paste, a graphene paste, or a silver paste. The conductive layer may be a composite layer in which a silver layer is provided on a carbon layer or a graphene layer, or a mixed layer containing a mixture of a carbon paste or a graphene paste with a silver paste.

The conductive layer can be formed on the solid electrolyte layer by applying a conductive paste such as a carbon paste by, for example, sponge transfer, screen printing, spray coating, dispensing, or inkjet printing. Preferably, a cathode lead-out layer formed in a subsequent step is stacked while the conductive layer is viscous before drying. The thickness of the conductive layer is preferably 2 µm to 20 µm.

The cathode lead-out layer can be formed from metal foil or a printed electrode layer. In the case of the metal foil, the metal foil preferably contains at least one metal selected from the group consisting of Al, Cu, Ag, and an alloy mainly containing any of these metals. When the metal foil contains any of these metals, the metal foil can have a lower resistance value, and the ESR can be reduced. Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 µm to 50 µm, in view of better handling during production, smaller size, and lower ESR. In the case of the printed electrode layer, the cathode lead-out layer can be formed in a predetermined region by applying an electrode paste to the conductive layer by, for example, sponge transfer, screen printing, spray coating, dispensing, or inkjet printing. The electrode paste is preferably one mainly containing Ag, Cu, or Ni. When the cathode lead-out layer is a printed electrode layer, the printed electrode layer can be made thinner than the cathode lead-out layer formed from metal foil. In the case of screen printing, the printed electrode layer can have a thickness of 2 µm to 20 µm.

The cathode lead-out layer 7c is led out to the second end surface 9b of the resin molding 9 and electrically connected to the second external electrode 13.

The sealing resin 8 defining the resin molding 9 contains at least a resin, and preferably contains a resin and a filler. Preferably, examples of the resin include epoxy resins, phenolic resins, polyimide resins, silicone resins, polyamide resins, and liquid crystal polymers. The sealing resin 8 can be used in the form of either a solid resin or a liquid resin. Preferably, examples of the filler include silica particles, alumina particles, and metal particles. Use of a material obtained by adding silica particles to a solid epoxy resin and a phenolic resin is more preferred as the sealing resin. When a solid sealing material is used, preferably, the molding method of the resin molding uses a resin mold such as a compression mold or a transfer mold. Use of a compression mold is more preferred. When a liquid sealing material is used, use of a molding method such as dispensing or printing is preferred. Preferably, a compression mold is used to seal the stack 30 of the capacitor elements 20 each including the anode 3, the dielectric layer 5, and the cathode 7 with the sealing resin 8 to obtain the resin molding 9.

The resin molding 9 has a cuboid shape, and includes the top surface 9d and the bottom surface 9c as the LW planes, the first side surface 9e and the second side surface 9f as the LT planes, and the first end surface 9a and the second end surface 9b as the WT planes. The resin molding 9 includes a support substrate 9g on its bottom, and a surface of the bottom of the support substrate 9g is the bottom surface 9c of the resin molding 9. The support substrate is provided to integrate the stack of multiple capacitor elements, and is preferably made of a glass epoxy substrate.

In the resin molding 9, top corner portions 9a1 and 9b1 and bottom corner portions 9a2 and 9b2 are rounded to have an R (curvature radius) by barrel polishing after molding in a resin mold. A resin molding is softer than a ceramic body and it is thus difficult to round each corner to have an R by barrel polishing. Yet, each corner can be rounded to have a small R by adjusting the composition, particle size, and shape of a medium, treatment time in a barrel, and the like.

Due to the difference in hardness between the sealing resin 8 and the support substrate 9g (sealing resin<support substrate), the top corner portions 9a1 and 9b1 each have an R (curvature radius) greater than the R (curvature radius) of each of the bottom corner portions 9a2 and 9b2.

The following specifically describes the configurations of the external electrodes included in the electrolytic capacitor. The first external electrode 11 includes a first end surface electrode on the first end surface 9a and a first bottom surface electrode on the bottom surface 9c that are integrated with each other. An electrode thickness (indicated by a double-headed arrow t1 in FIG. 2) of the first end surface electrode on the first end surface 9a is smaller than an electrode thickness (indicated by a double-headed arrow t2 in FIG. 2) of the first bottom surface electrode on the bottom surface 9c. As shown in FIG. 1 and FIG. 2, the first external electrode 11 is further provided in an integrated manner on the top surface 9d, the first side surface 9e, and the second side surface 9f. The first external electrode 11 is configured such that the electrode thickness (indicated by the double-headed arrow t1 in FIG. 2) of the first end surface electrode on the first end surface 9a is smaller than an electrode thickness (indicated by a double-headed arrow t3 in FIG. 2) on the top surface 9d. The first external electrode 11 is also configured such that the electrode thickness (indicated by the double-headed arrow t1 in FIG. 2) of the first end surface electrode on the first end surface 9a is smaller than an electrode thickness (indicated by a double-headed arrow We11 in FIG. 4 to FIG. 6 described in detail later) on the first side surface 9e and is smaller than an electrode thickness (indicated by a double-headed arrow Wf11 in FIG. 4 to FIG. 6 described in detail later) on the second side surface 9f.

As is the case with the first external electrode 11, the second external electrode 13 includes a second end surface electrode on the second end surface 9b and a second bottom surface electrode on the bottom surface 9c that are integrated with each other. An electrode thickness (indicated by a double-headed arrow t4 in FIG. 2) of the second end surface electrode on the second end surface 9b is smaller than an electrode thickness (indicated by a double-headed arrow t5 in FIG. 2) of the second bottom surface electrode on the bottom surface 9c. As shown in FIG. 1 and FIG. 2, the second external electrode 13 is further provided in an integrated manner on the top surface 9d, the first side surface 9e, and the second side surface 9f. The second external electrode 13 is configured such that the electrode thickness (indicated by the double-headed arrow t4 in FIG. 2) of the second end surface electrode on the second end surface 9b is smaller than an electrode thickness (indicated by a double-headed arrow t6 in FIG. 2) on the top surface 9d. The second external electrode 13 is also configured such that the electrode thickness (indicated by the double-headed arrow t4 in FIG. 2) of the second end surface electrode on the second end surface 9b is smaller than an electrode thickness (indicated by a double-headed arrow We13 in FIG. 4 to FIG. 6 described in detail later) on the first side surface 9e and is smaller than an electrode thickness (indicated by a double-headed arrow Wf13 in FIG. 4 to FIG. 6 described in detail later) on the second side surface 9f.

The electrode thickness of the external electrode on each of the end surface, top surface, and bottom surface is the thickness from a surface of the resin molding (electronic component body) to a surface of the external electrode. Each external electrode of the electrolytic capacitor 1 shown in FIG. 2 includes an inner plating layer, a resin electrode layer, and an outer plating layer. The thickness of the external electrode is the total thickness of the inner plating layer, resin electrode layer, and outer plating layer.

In the electrolytic capacitor shown in FIG. 1 and FIG. 2, the electrode thickness on the bottom surface and the electrode thickness on the top surface are the same. Thus, the result is the same regardless of whether the electrode thickness on the end surface is compared to the electrode thickness on the bottom surface or the electrode thickness on the top surface. However, there is a case where the electrode thickness on the bottom surface is different from the electrode thickness on the top surface, and in such a case, the electrode thickness on the end surface is compared to the electrode thickness on the bottom surface or the top surface, whichever is smaller.

When the first external electrode 11 is on the first end surface 9a, the bottom surface 9c, the top surface 9d, the first side surface 9e, and the second side surface 9f, the first external electrode 11 has an external appearance of a dog-bone shape formed on the first end surface and its four adjacent surfaces and has a C-shaped cross section. The first external electrode 11 may have an L-shape formed on the first end surface 9a and the bottom surface 9c. When the second external electrode 13 is on the second end surface 9b, the bottom surface 9c, the top surface 9d, the first side surface 9e, and the second side surface 9f, the second external electrode 13 has an external appearance of a dog-bone shape formed on the second end surface and its four adjacent surfaces and has a C-shaped cross section. The second external electrode 13 may have an L-shape formed on the second end surface 9b and the bottom surface 9c.

As described above, the electrodes on the end surface and the bottom surface of the electronic component body are integrated with each other to form an external electrode. This prevents formation of an interface between the external electrode on the end surface and the external electrode on the bottom surface, which can prevent interfacial resistance resulting from such an interface. Thus, such an external electrode can have a lower ESR. In addition, when the electrode thickness on the end surface is smaller than the electrode thickness on the bottom surface, the resulting electronic component can have higher dimensional accuracy, especially in the length direction (L direction) thereof.

Preferably, the first external electrode and the second external electrode each include a resin electrode layer containing a conductive component and a resin component. Preferably, the first external electrode and the second external electrode each also include an inner plating layer and an outer plating layer in addition to the resin electrode layer. The following describes the first external electrode and the second external electrode each including an inner plating layer, a resin electrode layer, and an outer plating layer with reference to FIG. 2. The resin electrode layer shown in FIG. 2 is a printed resin electrode layer formed by screen printing an electrode paste.

FIG. 2 shows layer structures of the first external electrode 11 and the second external electrode 13 included in the electrolytic capacitor 1. The first external electrode 11 includes an inner plating layer 11a, a resin electrode layer 11b, and an outer plating layer 11c. The inner plating layer 11a includes a Ni plating layer 11a1 and a Ag plating layer 11a2. The outer plating layer 11c includes a Ni plating layer 11c1 and a Sn plating layer 11c2. The resin electrode layer 11b includes a Ag printed resin electrode layer 11b1. The second external electrode 13 includes an inner plating layer 13a, a resin electrode layer 13b, and an outer plating layer 13c. The inner plating layer 13a includes a Ni plating layer 13a1 and a Ag plating layer 13a2. The outer plating layer 13c includes a Ni plating layer 13c1 and a Sn plating layer 13c2. The resin electrode layer 13b includes a Ag printed resin electrode layer 13b1.

Preferably, the Ni plating layer 11a1 as the inner plating layer 11a is formed by a zincate treatment. In other words, the surface of aluminum foil of the anode 3 exposed at the first end surface 9a of the resin molding 9 is alkaline etched to remove an oxide film of the anode 3, and Zn plating is then performed. Subsequently, electroless Ni plating is performed as displacement plating, whereby the Ni plating layer 11a1 is formed. A Ni plating layer 13a1 as the inner plating layer 13a can also be formed as in the Ni plating layer 11a1, but the zincate treatment may not be required. However, when the cathode lead-out layer 7c contains Al, the zincate treatment is preferably performed. The Ag plating layers 11a2 and 13a2 as the inner plating layers are formed to prevent oxidation of the Ni plating layers 11a1 and 13a1, respectively. Ag electroplating is continuously performed without exposing the electroless Ni plated layers to an atmosphere.

The resin electrode layers 11b and 13b each contain a conductive component and a resin component. Preferably, the conductive component mainly contains Ag, Cu, Ni, Sn, or the like. Preferably, the resin component mainly contains an epoxy resin, a phenolic resin, or the like. Preferably, each resin electrode layer contains a conductive component in an amount of 67 wt % to 97 wt % and a resin component in an amount of 3 wt % to 33 wt %. More preferably, each resin electrode layer contains a conductive component in an amount of 72 wt % to 95 wt % and a resin component in an amount of 5 wt % to 28 wt %. Still more preferably, each resin electrode layer contains a conductive component in an amount of 78 wt % to 95 wt % and a resin component in an amount of 5 wt % to 22 wt %. Yet still more preferably, each resin electrode layer contains a conductive component in an amount of 79 wt % to 89 wt % and a resin component in an amount of 11 wt % to 21 wt %.

Preferably, each resin electrode layer is a printed resin electrode layer formed by screen printing an electrode paste. Here, more preferably, the electrode paste is a Ag electrode paste containing a resin and a Ag filler containing Ag as a conductive component, and each resin electrode layer is a Ag printed resin electrode layer formed by screen printing.

When the resin electrode layers are printed resin electrode layers, the external electrodes on the first end surface and the second end surface can be made flat, as compared to the case where the resin electrode layers are formed by dipping in the electrode paste. In other words, the first external electrode and the second external electrode have better thickness uniformity. When the flatness of each of the first external electrode and the second external electrode is measured in a cross section as shown in FIG. 2, preferably, the variation in thickness of the first external electrode measured from the first end surface of the resin molding and the variation in thickness of the second external electrode measured from the second end surface of the resin molding do not exceed 10 μm. More preferably, these variations in thickness do not exceed 8 μm. Still more preferably, these variations in thickness do not exceed 5 μm.

When the resin electrode layers are printed resin electrode layers formed by screen printing an electrode paste, the electrode paste preferably contains a conductive component in an amount of 60 wt % to 95 wt % and a resin component in an amount of 3 wt % to 30 wt %. More preferably, the electrode paste contains a conductive component in an amount of 65 wt % to 90 wt % and a resin component in an amount of 5 wt % to 25 wt %. Still more preferably, the electrode paste contains a conductive component in an amount of 70 wt % to 90 wt % and a resin component in an amount of 5 wt % to 20 wt %. Yet still more preferably, the electrode paste contains a conductive component in an amount of 75 wt % to 85 wt % and a resin component in an amount of 10 wt % to 20 wt %. The electrode paste may contain an organic solvent, and the organic solvent is preferably a glycol ether-based solvent. Examples include diethylene glycol monobutyl ether and diethylene glycol monophenyl ether. The electrode paste may also contain an additive in an amount of less than 5 wt %, if necessary. The additive is effective in adjusting the rheology, especially thixotropy, of the electrode paste. Preferably, the viscosity of the electrode paste used in the present embodiment is higher than the viscosity of the electrode paste used in common screen printing. Assuming that the viscosity of the electrode paste used in common screen printing is 1, the viscosity of the electrode paste used in the present embodiment is preferably 1.2 to 2.0. In other words, preferably, the electrode paste has a higher viscosity in order to form an external electrode in an integrated manner on the first end surface, bottom surface, top surface, and side surfaces by simultaneously immersing the resin molding in the electrode paste and screen printing (described later).

The Ni plating layers 11c1 and 13c1 of the outer plating layers 11c and 13c, respectively, are formed mainly to improve moisture resistance. The Sn plating layers 11c2 and 13c2 are formed mainly to improve solderability.

Figure 3:
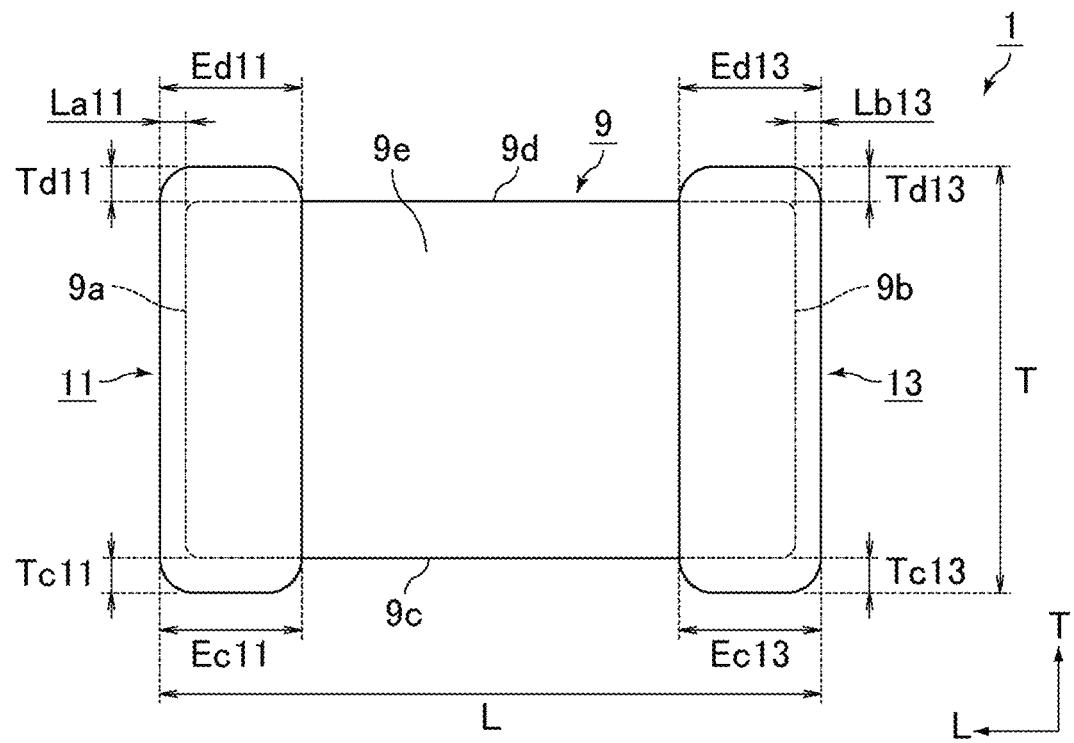
FIG. 3 is a schematic side view showing a dimensional relationship on an LT plane of the electrolytic capacitor.

FIG. 3 is a schematic side view showing a dimensional relationship on the LT plane of the electrolytic capacitor. FIG. 3 only shows the resin molding 9, the first external electrode 11, and the second external electrode 13 of the electrolytic capacitor 1. In FIG. 3, the length of the electrolytic capacitor 1 is indicated by a double-headed arrow L, and the thickness thereof is indicated by a double-headed arrow T.

In FIG. 3, the length and the thickness of the first external electrode 11 on the bottom surface 9c of the resin molding 9 are indicated by double-headed arrows Ec11 and Tc11, respectively, and the length and the thickness of the first external electrode 11 on the top surface 9d of the resin molding 9 are indicated by double-headed arrows Ed11 and Td11, respectively. The length and the thickness of the second external electrode 13 on the bottom surface 9c of the resin molding 9 are indicated by double-headed arrows Ec13 and Tc13, respectively, and the length and the thickness of the second external electrode 13 on the top surface 9d of the resin molding 9 are indicated by double-headed arrows Ed13 and Td13, respectively. The thickness of the first external electrode 11 on the first end surface 9a of the resin molding 9 is indicated by a double-headed arrow La11, and the thickness of the second external electrode 13 on the second end surface 9b of the resin molding 9 is indicated by a double-headed arrow Lb13.

Figure 4:
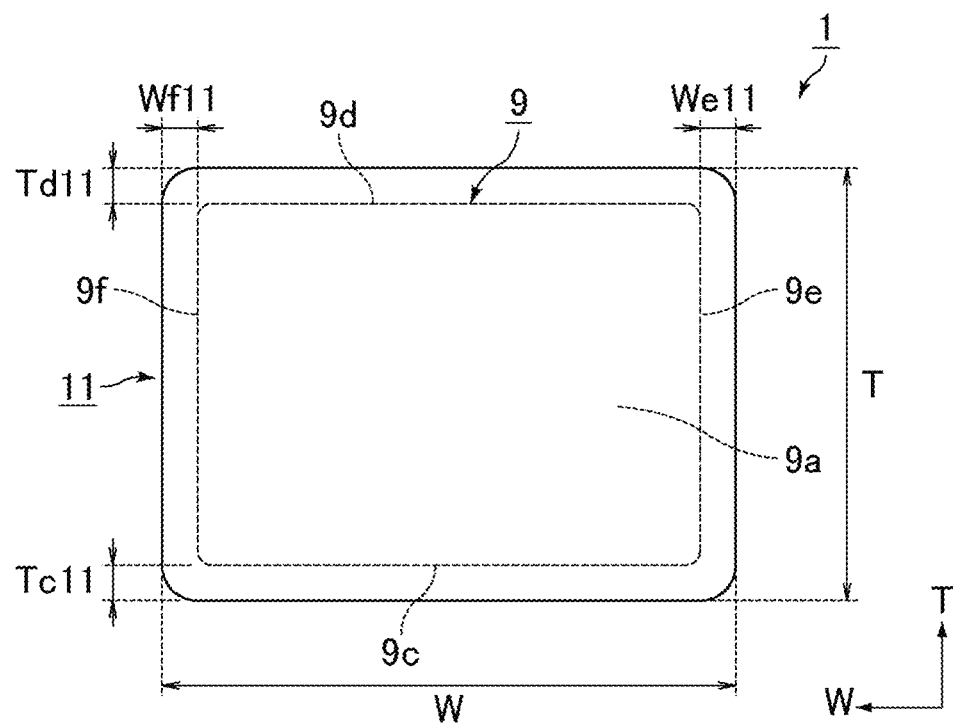
FIG. 4 is a schematic side view (end view) showing a dimensional relationship on a WT plane of the electrolytic capacitor.

FIG. 4 is a schematic side view (end view) showing a dimensional relationship on the WT plane of the electrolytic capacitor. FIG. 4 shows the electrolytic capacitor 1 seen from the first end surface 9a side. The view is the same when the electrolytic capacitor 1 is seen from the second end surface 9b side. In FIG. 4, the width of the electrolytic capacitor 1 is indicated by a double-headed arrow W, and the thickness thereof is indicated by a double-headed arrow T. In FIG. 4, the thickness of the first external electrode 11 on the bottom surface 9c and the thickness thereof on the top surface 9d of the resin molding 9 are indicated by double-headed arrows Tc11 and Td11, respectively. The thicknesses (in the width direction) of the first external electrode 11 on the first side surface 9e and the second side surface 9f of the resin molding 9 are indicated by double-headed arrows We11 and Wf11, respectively.

Figure 5:
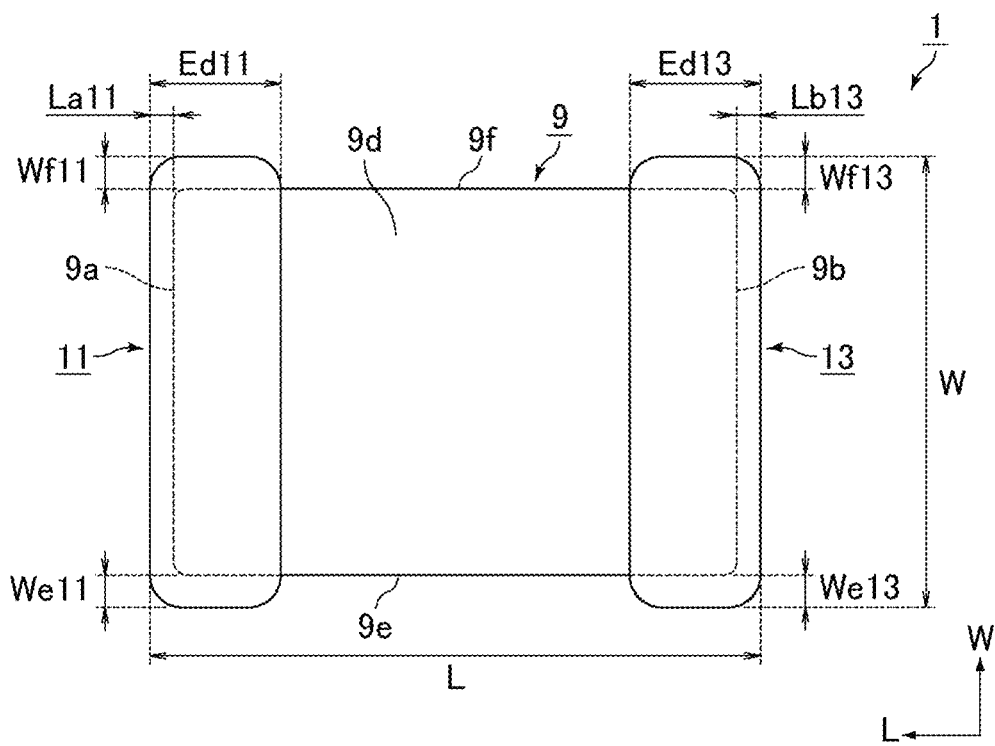
FIG. 5 is a schematic top view showing a dimensional relationship on an LW plane of the electrolytic capacitor.
Figure 6:
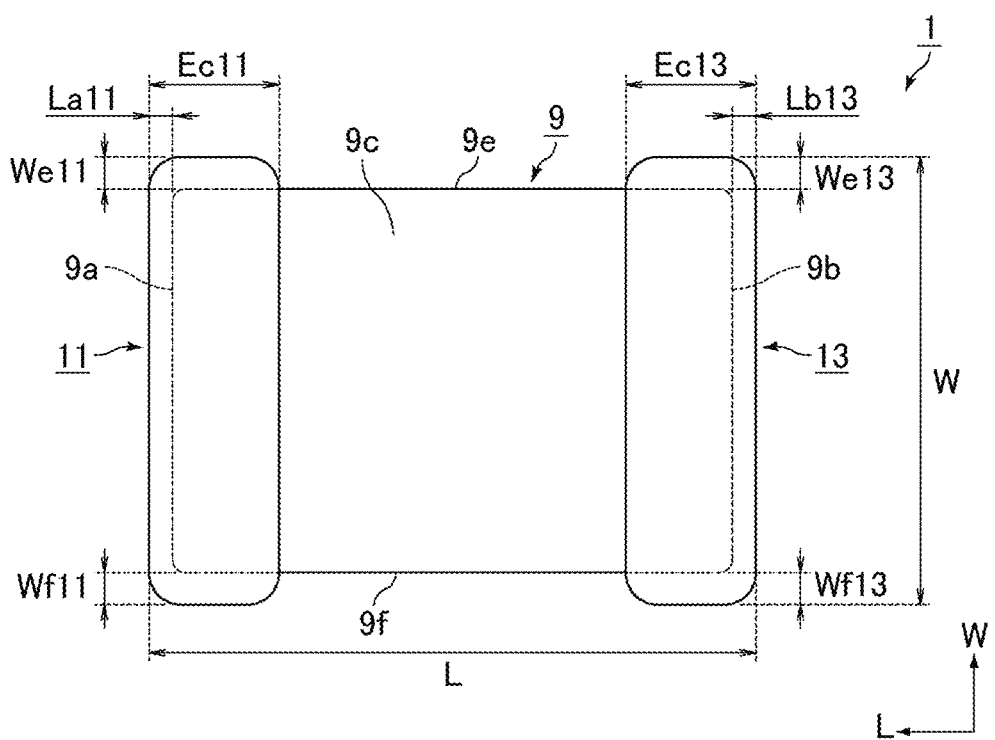
FIG. 6 is a schematic bottom view showing a dimensional relationship on an LW plane of the electrolytic capacitor.

FIG. 5 is a schematic top view showing a dimensional relationship on the LW plane of the electrolytic capacitor. FIG. 6 is a schematic bottom view showing a dimensional relationship on the LW plane of the electrolytic capacitor. FIG. 5 is a view of the electrolytic capacitor 1 seen from the top surface 9d side. FIG. 6 is a view of the electrolytic capacitor 1 seen from the bottom surface 9c side. The thicknesses (in the width direction) of the second external electrode 13 on the first side surface 9e and the second side surface 9f of the resin molding 9 are indicated by double-headed arrows We13 and Wf13, respectively. Other dimensions shown in FIG. 5 and FIG. 6 are as described above for the dimensions with reference to FIG. 3 and FIG. 4.

Examples of preferred ranges of the dimensions shown in the above figures are as described below.

Dimensions of Electrolytic Capacitor
- Dimension of L: 3.4 mm to 3.8 mm; representative value: 3.5 mm
- Dimension of W: 2.7 mm to 3.0 mm; representative value: 2.8 mm
- Dimension of T: 0.8 mm to 2.0 mm; representative value: 1.9 mm Dimensions of External Electrodes
- Dimensions of La11 and La13 (thickness dimensions of the first and second external electrodes on the end surface): 0.005 mm to 0.06 mm; representative value: 0.03 mm
- Dimensions of Ed11 and Ed13 (length dimensions of the first and second external electrodes on the top surface): 0.2 mm to 0.7 mm; representative value: 0.5 mm
- Dimensions of Ec11 and Ec13 (length dimensions of the first and second external electrodes on the bottom surfaces): 0.2 mm to 0.7 mm; representative value: 0.5 mm
- Dimensions of We11, Wf11, We13, and Wf13 (thickness dimensions of the first and second external electrodes in the width direction): 0.05 mm to 0.2 mm; representative value: 0.1 mm
- Dimensions of Tc11 and Tc13 (thickness dimensions of the first and second external electrodes on the bottom surface): 0.05 mm to 0.2 mm; representative value: 0.1 mm
- Dimensions of Td11 and Td13 (thickness dimensions of the first and second external electrodes on the top surface): 0.05 mm to 0.2 mm; representative value: 0.1 mm The definition and preferred ranges of each dimension shown in FIG. 3 to FIG. 6 vary depending on the size of an electronic component among embodiments of other electrolytic capacitors and embodiments of multilayer ceramic electronic components (described later). For example, each of Ed11, Ed13, Ec11, and Ec13 is preferably 1/10 to 1/5 of the dimension L of the relevant electronic component; each of Td11, Tc11, Td13, and Tc13 is preferably 1/20 to 1/10 of the dimension T of the relevant electronic component; and each of La11 and Lb13 is preferably 1/60 to 1/30 of the dimension L of the relevant electronic component.

Figure 7:
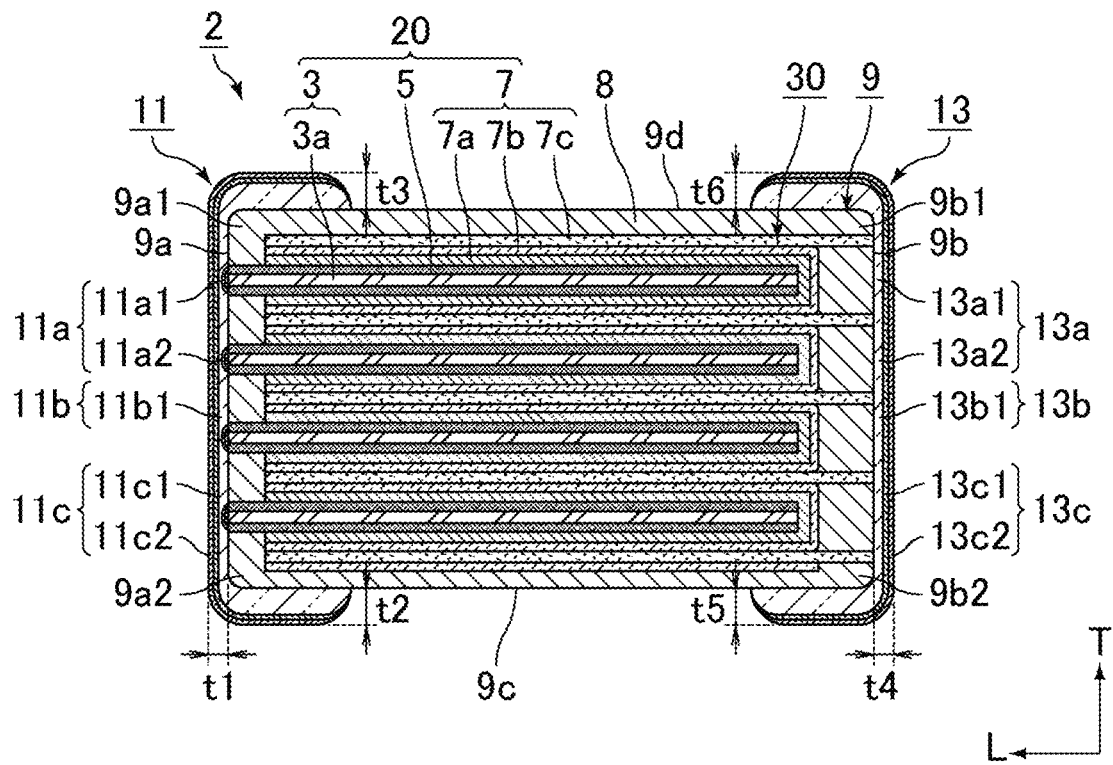
FIG. 7 is a schematic cross-sectional view of an example of an electrolytic capacitor of a second embodiment.

The following describes an electrolytic capacitor that is another embodiment of the electronic component of the present invention. The electrolytic capacitor of this embodiment is referred to as an electrolytic capacitor of a second embodiment. The electrolytic capacitor of the second embodiment has a configuration similar to that of the electrolytic capacitor of the first embodiment, except that the electrolytic capacitor of the second embodiment does not include a support substrate. FIG. 7 is a schematic cross-sectional view of an example of the electrolytic capacitor of the second embodiment. An electrolytic capacitor 2 shown in FIG. 7 does not include a support substrate on the bottom of the resin molding 9. The bottom surface 9c of the resin molding 9 is a surface of the sealing resin 8. Other configurations are similar to those of the electrolytic capacitor 1 shown in FIG. 2, so that detailed descriptions of the other configurations are omitted.

The electrolytic capacitor according to each embodiment of the electronic component of the present invention described above is a solid electrolytic capacitor including a solid electrolyte layer. Yet, the electrolytic capacitor may be an electrolytic capacitor in which an electrolytic solution is used instead of a solid electrolyte, or may be an electrolytic capacitor in which a solid electrolyte and an electrolytic solution are both used. The stack including the capacitor elements preferably includes multiple capacitor elements but may include only one capacitor element.

The following describes a multilayer ceramic electronic component as another example of the electronic component of the present invention. In the multilayer ceramic electronic component as the electronic component of the present invention, preferably, the electronic component body includes a cuboid stack in which at least any one of a dielectric ceramic layer, a magnetic ceramic layer, a piezoelectric ceramic layer, or a semiconductor ceramic layer and internal electrode layers are stacked, the internal electrode layers defining internal electrodes.

Figure 8:
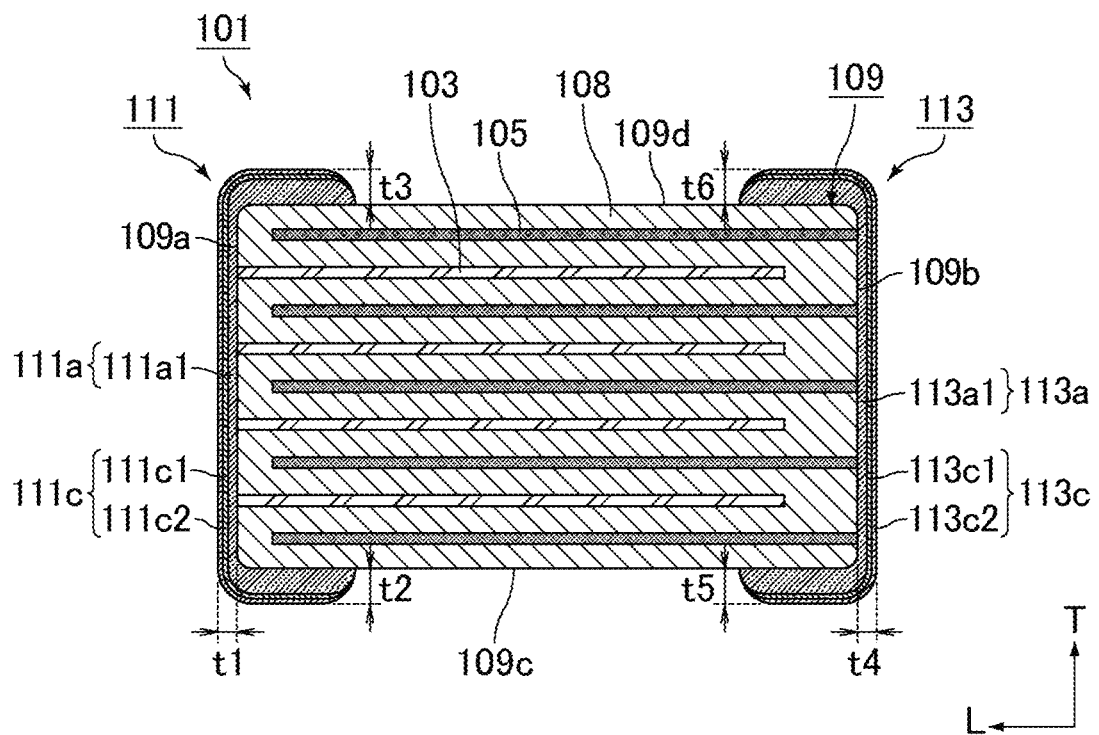
FIG. 8 is a schematic cross-sectional view of an example of a multilayer ceramic electronic component of a third embodiment.

Examples of the multilayer ceramic electronic component include multilayer ceramic capacitors, multilayer coils, multilayer thermistors, multilayer varistors, multilayer LC filters, and multilayer piezoelectric filters. The following describes a multilayer ceramic capacitor as an example of the multilayer ceramic electronic component. The multilayer ceramic capacitor of this embodiment is referred to as a multilayer ceramic electronic component of a third embodiment. FIG. 8 is a schematic cross-sectional view of an example of the multilayer ceramic electronic component of the third embodiment. A multilayer ceramic capacitor 101 includes a cuboid stack 109 in which a dielectric ceramic layer 108, an internal electrode layer 103, and an internal electrode layer 105 are stacked. The internal electrode layer 103 is connected to a first external electrode 111, and the internal electrode layer 105 is connected to a second external electrode 113. The stack 109 corresponds to an electronic component body.

The stack 109 has a first end surface 109a, a second end surface 109b, a bottom surface 109c, and a top surface 109d, as well as a first side surface and a second side surface (not shown).

The dielectric ceramic layer defining the stack contains dielectric ceramics such as barium titanate. The dielectric ceramic layer can be obtained by molding a dielectric slurry containing dielectric ceramics and an organic solvent into a sheet.

The internal electrode layers defining the stack can be obtained by printing an electrode paste containing a conductive component. Preferably, each internal electrode layer is a Ni electrode layer containing Ni as a conductive component. Each internal electrode layer may be a Ag electrode layer, a Pd electrode layer, or a Cu electrode layer, instead of a Ni electrode layer.

The first external electrode 111 includes an electrode on the first end surface 109a and an electrode on the bottom surface 109c that are integrated with each other. An electrode thickness (indicated by a double-headed arrow t1 in FIG. 8) on the first end surface 109a is smaller than an electrode thickness (indicated by a double-headed arrow t2 in FIG. 8) on the bottom surface 109c. The first external electrode 111 is further provided in an integrated manner on the top surface 109d as well as the first side surface and the second side surface (not shown). The first external electrode 111 is configured such that the electrode thickness (indicated by a double-headed arrow t1 in FIG. 8) on the first end surface 109a is smaller than an electrode thickness (indicated by a double-headed arrow t3 in FIG. 8) on the top surface 109d.

The second external electrode 113 includes an electrode on the second end surface 109b and an electrode on the bottom surface 109c that are integrated with each other. The second external electrode 113 is configured such that an electrode thickness (indicated by a double-headed arrow t4 in FIG. 8) on the second end surface 109b is smaller than an electrode thickness (indicated by a double-headed arrow t5 in FIG. 8) on the bottom surface 109c. The second external electrode 113 is further provided in an integrated manner on the top surface 109d as well as the first side surface and the second side surface (not shown). The second external electrode 113 is configured such that the electrode thickness (indicated by the double-headed arrow t4 in FIG. 8) on the second end surface 109b is smaller than an electrode thickness (indicated by a double-headed arrow t6 in FIG. 8) on the top surface 109d.

The electrode thickness of the external electrode on each of the end surface, top surface, and bottom surface is the thickness from a surface of the stack (electronic component body) to a surface of the external electrode. Each external electrode of the multilayer ceramic capacitor 101 shown in FIG. 8 includes a baked electrode layer and an outer plating layer. The thickness of each external electrode is the total thickness of the baked electrode layer and the outer plating layer.

Each external electrode of the multilayer ceramic capacitor may have any composition, but preferably includes a baked electrode layer and an outer plating layer. FIG. 8 shows layer structures of the first external electrode 111 and the second external electrode 113 included in the multilayer ceramic capacitor 101. The first external electrode 111 includes a baked electrode layer 111a and an outer plating layer 111c. The outer plating layer 111c includes a Ni plating layer 111c1 and a Sn plating layer 111c2. The baked electrode layer 111a includes a Cu-baked electrode layer Mal. The second external electrode 113 includes a baked electrode layer 113a and an outer plating layer 113c. The outer plating layer 113c includes a Ni plating layer 113c1 and a Sn plating layer 113c2. The baked electrode layer 113a includes a Cu-baked electrode layer 113a1.

The Cu-baked electrode layers 111a1 and 113a1 each contain a conductive component mainly containing Cu. The Cu-baked electrode layers can be formed by screen printing and baking a Cu electrode paste containing a conductive component, a resin component, and an organic solvent. In other words, the Cu-baked electrode layers can be printed electrode layers formed by screen printing an electrode paste. Alternatively, each Cu-baked electrode layer may be a Ag-baked electrode layer or a Ni-baked electrode layer. Such a baked electrode layer may also contain glass. Preferably, the baking temperature is 700° C. or higher and 900° C. or lower. Preferably, baking is performed in a non-oxidizing atmosphere.

The outer plating layer is not limited to one having a two-layer structure of a Ni plating layer and a Sn plating layer. For example, it may have a three-layer structure in which a Cu plating layer is provided on the inner side of a Ni plating layer.

The outer plating layer may be the outer plating layer mentioned in the description of the electrolytic capacitor of the first embodiment.

Figure 9:
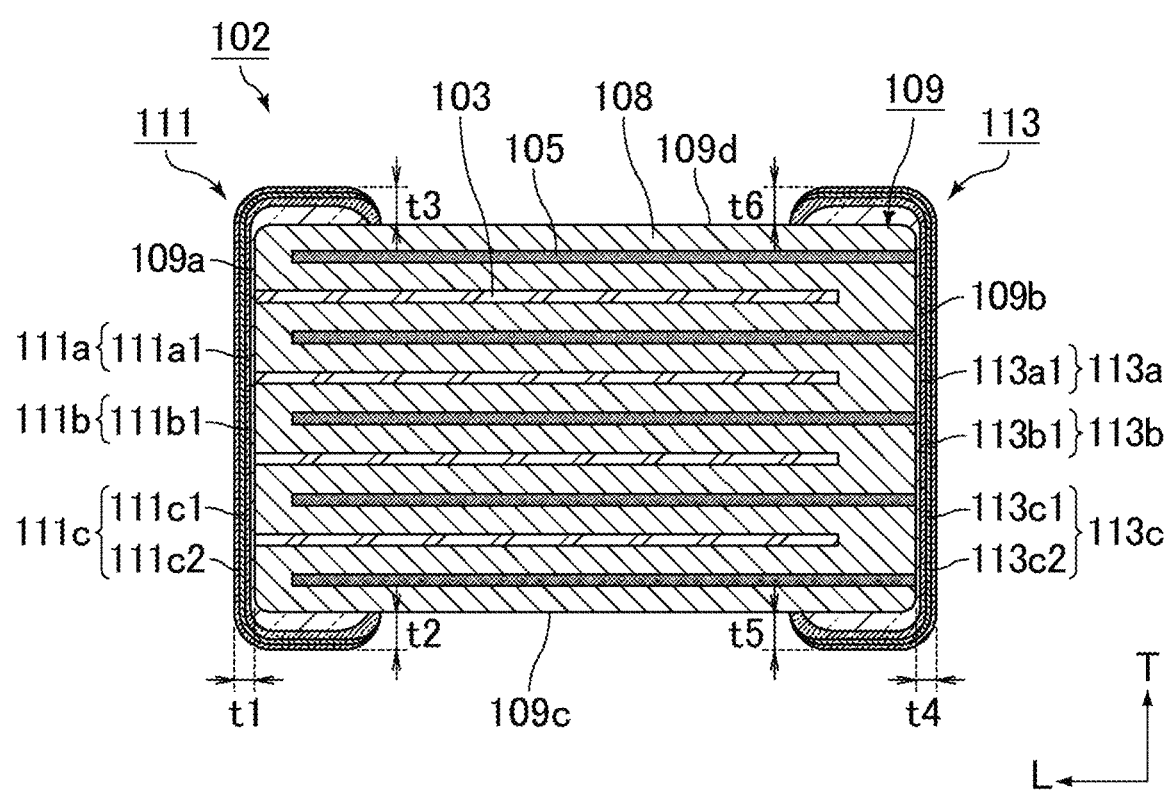
FIG. 9 is a schematic cross-sectional view of an example of a multilayer ceramic electronic component of a fourth embodiment.

The following describes a multilayer ceramic electronic component as another embodiment of the electronic component of the present invention. The multilayer ceramic electronic component of this embodiment is referred to as a multilayer ceramic electronic component of a fourth embodiment. The multilayer ceramic electronic component of the fourth embodiment has a configuration similar to that of the multilayer ceramic electronic component of the third embodiment, except that each external electrode includes a resin electrode layer. FIG. 9 is a schematic cross-sectional view of an example of the multilayer ceramic electronic component of the fourth embodiment. In a multilayer ceramic capacitor 102 shown in FIG. 9, the first external electrode 111 includes a baked electrode layer 111a, a resin electrode layer 111b, and an outer plating layer 111c. The second external electrode 113 includes a baked electrode layer 113a, a resin electrode layer 113b, and an outer plating layer 113c. The resin electrode layer may be the resin electrode layer mentioned in the description of the electrolytic capacitor of the first embodiment. Preferably, the resin electrode layer is a printed resin electrode layer formed by screen printing an electrode paste. The resin electrode layers 111b and 113b may be Ag printed resin electrode layers 111b1 and 113b1, respectively.

The following describes a method of producing an electronic component of the present invention by which the above-described electronic components of the present invention can be produced. A first aspect of a method of producing an electronic component of the present invention includes: preparing a cuboid electronic component body including internal electrodes; screen printing an electrode paste on a first end surface of the electronic component body to form a first external electrode on the first end surface and a bottom surface of the electronic component body such that an electrode thickness on the first end surface is smaller than an electrode thickness on the bottom surface; and screen printing the electrode paste on a second end surface of the electronic component body to form a second external electrode on the second end surface and the bottom surface of the electronic component body such that an electrode thickness on the second end surface is smaller than an electrode thickness on the bottom surface.

The following describes the first aspect of the method of producing an electronic component of the present invention, taking a method of producing the electrolytic capacitor of the first embodiment as an example.

Production of Capacitor Element

A valve-action metal foil, such as aluminum foil, having a porous layer such as an etched layer on its surface is prepared, and a surface of the porous layer is anodized to form a dielectric layer. A solid electrolyte layer is formed on the dielectric layer by screen printing. Subsequently, a carbon layer is formed on the solid electrolyte layer by screen printing, and further, a cathode lead-out layer is formed on the carbon layer by sheet stacking or screen printing. A capacitor element is obtained by the above steps.

Stacking of Capacitor Elements and Sealing with Resin

Multiple capacitor elements are formed into a stack, and the stack is sealed with a sealing resin by a compression mold to obtain a resin molding (electronic component body). The stack is preferably produced on a support substrate.

Formation of External Electrodes

A Ag electrode paste as the electrode paste is screen printed on the first end surface of the resin molding, and the Ag electrode paste is then thermally cured to form a resin electrode layer. At this point, the resin electrode layer is also formed on the bottom surface of the resin molding. The resin electrode layer may also be formed on the top surface and side surfaces of the resin molding. Likewise, a Ag electrode paste as the electrode paste is screen printed on the second end surface of the resin molding, and the Ag electrode paste is then thermally cured to form a resin electrode layer. At this point, the resin electrode layer is also formed on the bottom surface of the resin molding. The resin electrode layer may also be formed on the top surface and side surfaces of the resin molding. In this step, the first external electrode is formed on the first end surface and the bottom surface such that the electrode thickness on the first end surface is smaller than the electrode thickness on the bottom surface. In addition, the second external electrode is formed on the second end surface and bottom surface such that the electrode thickness on the second end surface is smaller than the electrode thickness on the bottom surface.

Preferably, the first external electrode is formed on the first end surface, bottom surface, top surface, and side surfaces of the electronic component body. Preferably, the second external electrode is formed on the second end surface, bottom surface, top surface, and side surfaces of the electronic component body. Further, preferably, the first external electrode is formed such that the electrode thickness on the first end surface is smaller than the electrode thickness on each of the bottom surface, top surface, and side surfaces, and the second external electrode is formed such that the electrode thickness on the second end surface is smaller than the electrode thickness on each of the bottom surface, top surface, and side surfaces.

The Ag electrode paste contains a conductive component and a resin component, and the resulting resin electrode layer is a printed resin electrode layer. Preferably, the electrode paste used in this step contains a conductive component in an amount of 60 wt % to 95 wt % and a resin component in an amount of 3 wt % to 30 wt %. More preferably, the electrode paste contains a conductive component in an amount of 65 wt % to 90 wt % and a resin component in an amount of 5 wt % to 25 wt %. Still more preferably, the electrode paste contains a conductive component in an amount of 70 wt % to 90 wt % and a resin component in an amount of 5 wt % to 20 wt %. Yet still more preferably, the electrode paste contains a conductive component in an amount of 75 wt % to 85 wt % and a resin component in an amount of 10 wt % to 20 wt %. The electrode paste may contain an organic solvent, and the organic solvent is preferably a glycol ether-based solvent. Examples include diethylene glycol monobutyl ether and diethylene glycol monophenyl ether. The electrode paste may also contain an additive in an amount of less than 5 wt %, if necessary.

Preferably, the zincate treatment is performed before screen printing the Ag electrode paste, and a Ni plating layer is formed as the inner plating layer by the zincate treatment and displacement plating. Preferably, a Ag plating layer is further formed as the inner plating layer on the Ni plating layer.

Preferably, a Ni plating layer and a Sn plating layer are formed as outer plating layers. The electrolytic capacitor of the first embodiment can be produced by the above steps.

A second aspect of the method of producing an electronic component of the present invention includes: preparing a cuboid electronic component body including internal electrodes; screen printing an electrode paste on a first end surface of the electronic component body and simultaneously applying the electrode paste to a bottom surface of the electronic component body such that an electrode formed on the first end surface is integrated with an electrode formed on the bottom surface to form a first external electrode in which an electrode thickness on the first end surface is smaller than an electrode thickness on the bottom surface; and screen printing the electrode paste on a second end surface of the electronic component body and simultaneously applying the electrode paste to the bottom surface of the electronic component body such that an electrode formed on the second end surface is integrated with an electrode formed on the bottom surface to form a second external electrode in which an electrode thickness on the second end surface is smaller than an electrode thickness on the bottom surface.

The following describes the second aspect of the method of producing an electronic component of the present invention, taking a method of producing the electrolytic capacitor of the first embodiment as an example. A resin molding (electronic component body) is prepared by performing the steps from "Production of capacitor element" to "Stacking of capacitor elements and sealing with resin" as in the first aspect of the method of producing an electronic component of the present invention described above.

Formation of External Electrodes

An electrode paste is screen printed on the first end surface of the electronic component body, and simultaneously, the electrode paste is applied to the bottom surface of the electronic component body such that an electrode formed on the first end surface is integrated with an electrode formed on the bottom surface to form a first external electrode in which an electrode thickness on the first end surface is smaller than an electrode thickness on the bottom surface. The electrode paste may be one having a composition similar to the one described in the first aspect of the method of producing an electronic component of the present invention.

Preferably, the first external electrode is formed on the first end surface, bottom surface, top surface, and side surfaces of the electronic component body. Further, preferably, the first external electrode is formed such that the electrode thickness on the first end surface is smaller than the electrode thickness on each of the bottom surface, top surface, and side surfaces.

In this step, preferably, an electrode paste is applied to a screen printing plate and squeegeeing is performed to allow the electrode paste to be held in the screen printing plate, before screen printing the electrode paste. The following describes an example of such a step with reference to the drawings.

Figure 10A:
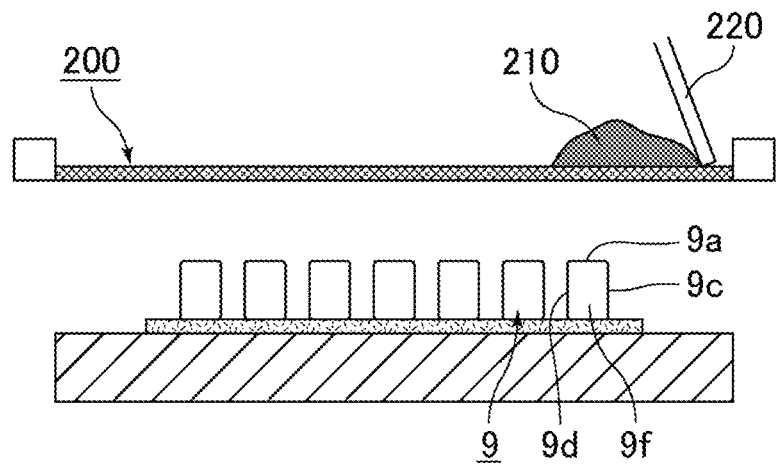
FIG. 10A, FIG. 10B, and FIG. 10C are schematic diagrams of a process for forming an external electrode.

FIG. 10A, FIG. 10B, and FIG. 10C, and FIG. 11A, FIG. 11B, and FIG. 11C are schematic diagrams of a process for forming an external electrode. FIG. 10A shows the resin moldings 9 as electronic component bodies in an aligned state, with their first end surfaces 9a facing up. Then, a screen printing plate 200 is arranged above the resin moldings 9, and an electrode paste 210 is applied to the screen printing plate 200.

Figure 10B:
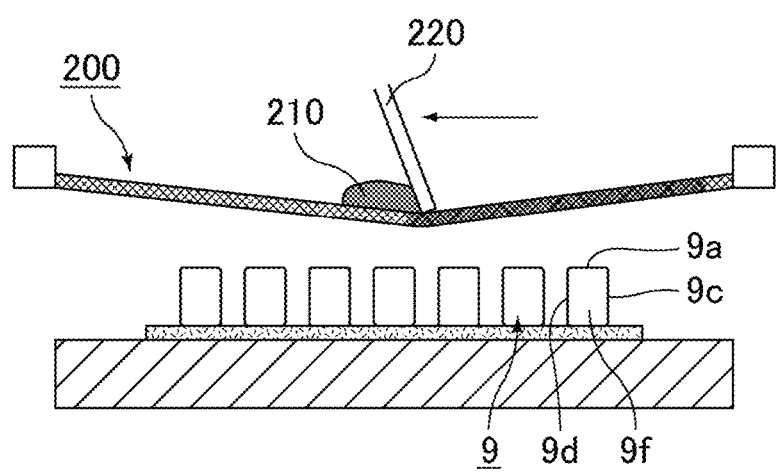
Figure 10C:
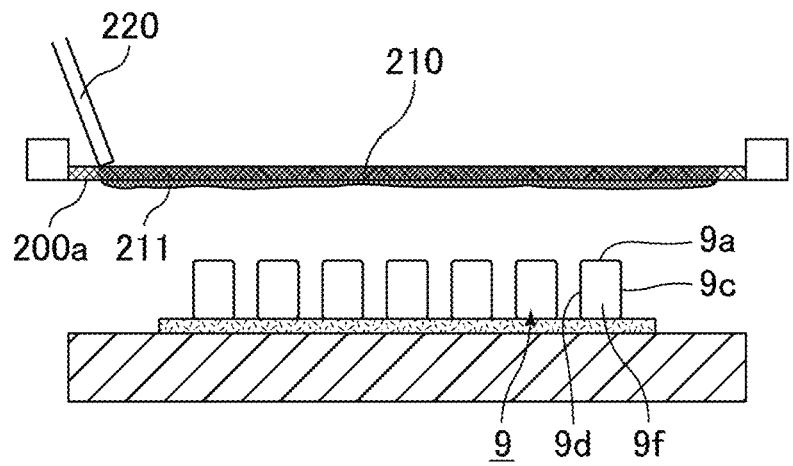

As shown in FIG. 10B, a squeegee 220 is moved on the screen printing plate 200 for squeegeeing. At this stage, squeegeeing is performed to allow the electrode paste 210 to be held in the screen printing plate 200, keeping the electrode paste 210 away from the resin moldings 9. FIG. 10C shows the electrode paste 210 being held in the screen printing plate 200. The electrode paste 210 held in the screen printing plate 200 is made to overflow from a lower surface 200a (a surface opposite to the squeegeed surface) of the screen printing plate 200. The overflowing portion of the electrode paste 210 is shown as an overflowing electrode paste 211.

Figure 11A:
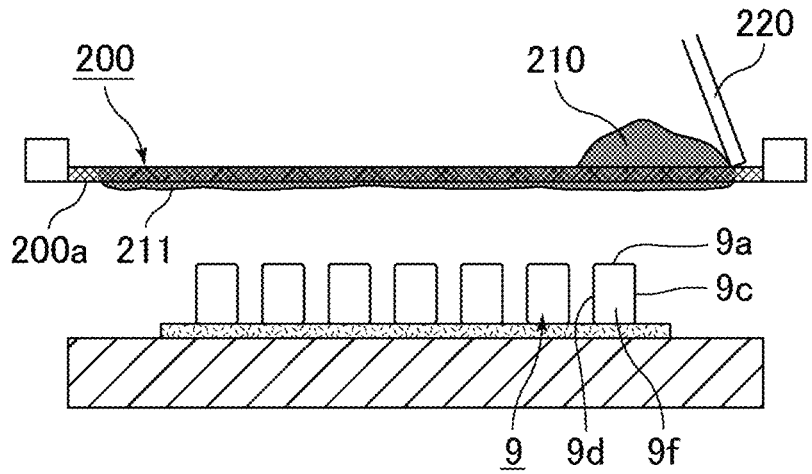
FIG. 11A, FIG. 11B, and FIG. 11C are schematic diagrams of a process for forming an external electrode.
Figure 11B:
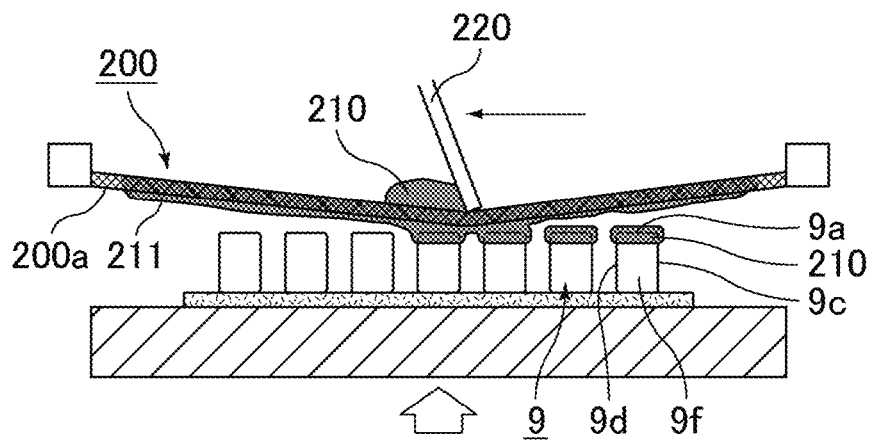

As shown in FIG. 11A, the electrode paste 210 is additionally applied to the screen printing plate 200. Then, as shown in FIG. 11B, the electrode paste 210 is screen printed on the first end surface 9a of each resin molding 9. At this point, the overflowing electrode paste 211 held on the lower surface 200a of the screen printing plate 200 is kept in contact with the first end surface 9a of each resin molding 9 to immerse the first end surface 9a and its surroundings of each resin molding 9 in the overflowing electrode paste 211. In this state, the squeegee 220 is moved to perform screen printing. Preferably, the squeegee speed in FIG. 10B is higher than the squeegee speed in FIG. 11B, when the squeegee speed in FIG. 10B is compared to the squeegee speed in FIG. 11B. Increasing the squeegee speed in FIG. 10B allows the electrode paste to be easily held in the screen printing plate 200. Decreasing the squeegee speed in FIG. 11B allows the electrode paste to be stably applied to the bottom surface, top surface, end surface, and side surfaces of each resin molding shown in FIG. 11C, which can improve the dimensional accuracy.

Figure 11C:
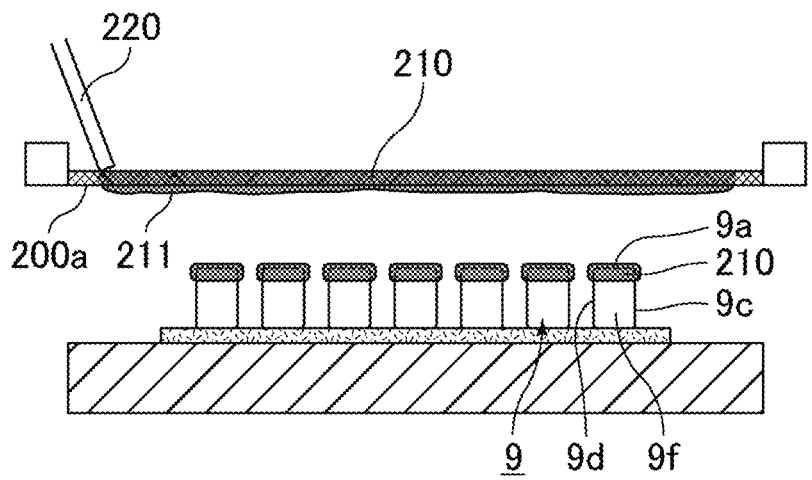

In this manner, as shown in FIG. 11C, the electrode paste 210 is applied not only to the first end surface 9a of each resin molding 9 but also simultaneously to the bottom surface 9c of each resin molding 9. In other words, the external electrode is formed in an integrated manner on the first end surface 9a and the bottom surface 9c by simultaneously immersing the resin molding 9 in the electrode paste 210 and screen printing. Likewise, the electrode paste 210 is simultaneously applied to the top surface 9d, the first side surface 9e, and the second side surface 9f of each resin molding 9.

The amount of the electrode paste 210 applied to the bottom surface 9c, the top surface 9d, the first side surface 9e, and the second side surface 9f of each resin molding 9 can be controlled by the amount of the overflowing electrode paste 211. When the immersion depth of the first end surface 9a and its surroundings of each resin molding 9 in the overflowing electrode paste 211 is deep, a larger amount of the electrode paste 210 is applied to the bottom surface 9c, the top surface 9d, the first side surface 9e, and the second side surface 9f of each resin molding 9. This results in an increased thickness of the electrode paste 210 on the bottom surface 9c, the top surface 9d, the first side surface 9e, and the second side surface 9f of each resin molding 9.

In contrast, in the case of screen printing, the screen printing plate 200 comes into contact with the first end surface 9a of each resin molding 9. The thickness of the electrode paste 210 printed on the first end surface 9a depends on the amount of the electrode paste 210 remaining on the first end surface 9a after the screen printing plate 200 is separated therefrom. Thus, the electrode paste 210 applied to the first end surface 9a of the resin molding 9 does not become much thick.

The electrode paste applied to the first end surface, bottom surface, and other surfaces of each resin molding in the manner as described above is thermally cured, whereby a resin electrode layer is formed. Additionally, an inner plating layer and an outer plating layer may be formed as in the first aspect of the method of producing an electronic component of the present invention described above.

By the above steps, the electrode paste is screen printed on the first end surface of the resin molding, and simultaneously, the electrode paste is applied to the bottom surface of the resin molding such that an electrode formed on the first end surface can be integrated with an electrode formed on the bottom surface to form a first external electrode in which an electrode thickness on the first end surface is smaller than an electrode thickness on the bottom surface. The first external electrode can be formed such that the electrode thickness on the first end surface is smaller than the electrode thickness on the bottom surface by increasing the thickness of the electrode paste to be formed on the bottom surface of the resin molding. The steps from applying the electrode paste 210 to the screen printing plate 200 shown in FIG. 10A to applying the electrode paste 210 to the resin molding 9 shown in FIG. 11C may be repeatedly performed. The amount of the electrode paste applied to each surface of the resin molding can be adjusted by repeating the steps.

The above has described the case where the first external electrode is formed on the first end surface of the resin molding. The second external electrode can also be formed in the same manner on the second end surface of the resin molding.

Preferably, the second external electrode is also formed on the second end surface, bottom surface, top surface, and side surfaces of the electronic component body. Further, preferably, the second external electrode is formed such that the electrode thickness on the second end surface is smaller than the electrode thickness on each of the bottom surface, top surface, and side surfaces of the electronic component body.

Figure 12:
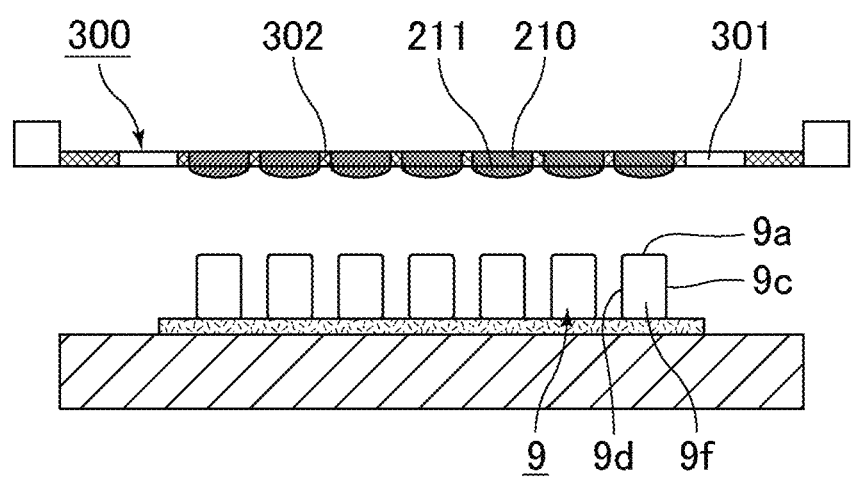
FIG. 12 is a schematic diagram of an example where a screen printing plate used in forming an external electrode is a patterned mesh.

FIG. 12 is a schematic diagram of an example where a screen printing plate used in forming an external electrode is a patterned mesh. A screen printing plate 300, which is a patterned mesh, includes pass-through portions 301 through which the electrode paste 210 passes and a masked portion (emulsion portion) 302 through which the electrode paste 210 does not pass. The pass-through portions 301 are formed according to the shape of the first end surface 9a of each resin molding 9 and are positioned according to the alignment of the resin moldings 9. Use of the screen printing plate 300 allows the overflowing electrode paste 211 to be provided at positions corresponding to the first end surfaces 9a of the resin moldings 9.

Use of a patterned mesh as the screen printing plate improves the dimensional accuracy of the resin electrode layer to be formed on each of the bottom surface, top surface, first side surface, and second side surface of the electronic component body. In addition, the electrode paste tends to remain on the screen printing plate, which increases the number of times that the screen printing plate can be squeegeed, resulting in higher productivity.

The above has described the first aspect and the second aspect of the method of producing an electronic component of the present invention, taking the method of producing the electrolytic capacitor of the first embodiment as an example. These methods are also applicable to the electrolytic capacitor of the second embodiment.

Also in the case of the multilayer ceramic electronic component as the electronic component of the present invention, a method similar to the above method can be used to provide external electrodes on a stack after the stack is produced. When forming external electrodes each including a baked electrode layer as the external electrodes, screen printing may be performed using an electrode paste for forming a baked electrode layer. The stack included in the multilayer ceramic electronic component can be produced by a method that is used in a method of producing a multilayer ceramic capacitor or a multilayer coil.

REFERENCE SIGNS LIST 1, 2: electrolytic capacitor
3: anode
3a: valve-action metal foil
5: dielectric layer
7: cathode
7a: solid electrolyte layer
7b: conductive layer
7c: cathode lead-out layer
8: sealing resin
9: resin molding (electronic component body)
9a, 109a: first end surface
9a1, 9b1: top corner portion
9a2, 9b2: bottom corner portion
9b, 109b: second end surface
9c, 109c: bottom surface
9d, 109d: top surface
9e: first side surface
9f: second side surface
9g: support substrate
11, 111: first external electrode
11a, 13a: inner plating layer
11a1, 13a1: Ni plating layer
11a2, 13a2: Ag plating layer
11b, 13b, 111b, 113b: resin electrode layer
11b1, 13b1, 111b1, 113b1: Ag printed resin electrode layer
11c, 13c, 111c, 113c: outer plating layer
11c1, 13c1, 111c1, 113c1: Ni plating layer
11c2, 13c2, 111c2, 113c2: Sn plating layer
13, 113: second external electrode
20: capacitor element
30: stack
101, 102: multilayer ceramic capacitor
103, 105: internal electrode layer
108: dielectric ceramic layer
109: stack (electronic component body)
111a, 113a: baked electrode layer
Mal, 113a1: Cu-baked electrode layer
200, 300: screen printing plate
200a: lower surface of screen printing plate
210: electrode paste
211: overflowing electrode paste
220: squeegee
301: pass-through portion
302: masked portion (emulsion portion)

The invention claimed is:

1. A method of producing an electronic component, the method comprising:
preparing an electronic component body including a first internal electrode exposed at a first end surface of the electronic component body and a second internal electrode exposed at a second end surface of the electronic component body;
applying an electrode paste to a screen printing plate;
squeegeeing such that the electrode paste is held in the screen printing plate and the electrode paste is made to overflow from a lower surface of the screen printing plate, and then:
screen printing the electrode paste on the first end surface and a bottom surface of the electronic component body to form a first external electrode having a first end surface electrode on the first end surface and a first bottom surface electrode on the bottom surface of the electronic component body such that a thickness of the first end surface electrode is smaller than a thickness of the first bottom surface electrode; and
screen printing the electrode paste on the second end surface and the bottom surface of the electronic component body to form a second external electrode having a second end surface electrode on the second end surface and a second bottom surface electrode on the bottom surface of the electronic component body such that a thickness of the second end surface electrode is smaller than a thickness of the second bottom surface electrode,
wherein a squeegee speed for squeegeeing the electrode paste in the screen printing plate is higher than a squeegee speed when the electrode paste is screen printed on the first end surface and the bottom surface or the second end surface and the bottom surface of the electronic component body.

2. The method of producing an electronic component according to claim 1, further comprising:
screen printing the electrode paste so as to form the first external electrode on a top surface, and side surfaces of the electronic component body; and
screen printing the electrode paste so as to form the second external electrode on the top surface, and the side surfaces of the electronic component body.

3. The method of producing an electronic component according to claim 2, wherein
the first external electrode is formed such that the thickness of the first end surface electrode is smaller than a thickness of the first external electrode on each of the bottom surface, the top surface, and the side surfaces, and
the second external electrode is formed such that the thickness of the second end surface electrode is smaller than a thickness of the second external electrode on each of the bottom surface, the top surface, and the side surfaces.

4. The method of producing an electronic component according to claim 1, wherein
the first external electrode and the second external electrode each comprise a resin electrode layer containing a conductive component and a resin component, and
the resin electrode layer contains the conductive component in an amount of 67 wt % to 97 wt % and the resin component in an amount of 3 wt % to 33 wt %.

5. A method of producing an electronic component, comprising:
preparing an electronic component body including a first internal electrode exposed at a first end surface of the electronic component body and a second internal electrode exposed at a second end surface of the electronic component body;
applying an electrode paste to a screen printing plate;
squeegeeing such that the electrode paste is held in the screen printing plate and the electrode paste is made to overflow from a lower surface of the screen printing plate, and then:
screen printing the electrode paste on a first end surface of the electronic component body and simultaneously applying the electrode paste to a bottom surface of the electronic component body such that a first end surface electrode formed on the first end surface is integrated with a first bottom surface electrode formed on the bottom surface and a thickness of the first end surface electrode is smaller than a thickness of the first bottom surface electrode; and screen printing the electrode paste on a second end surface of the electronic component body and simultaneously applying the electrode paste to the bottom surface of the electronic component body such that a second end surface electrode formed on the second end surface is integrated with a second bottom surface electrode formed on the bottom surface and a thickness of the second end surface electrode is smaller than a thickness of the second bottom surface electrode, wherein a squeegee speed for squeegeeing the electrode paste in the screen printing plate is higher than a squeegee speed when the electrode paste is screen printed on the first end surface and the bottom surface or the second end surface and the bottom surface of the electronic component body.

6. The method of producing an electronic component according to claim 5, further comprising:

screen printing the electrode paste so as to form the first external electrode on a top surface, and side surfaces of the electronic component body; and screen printing the electrode paste so as to form the second external electrode on the top surface, and the side surfaces of the electronic component body.

7. The method of producing an electronic component according to claim 6, wherein the first external electrode is formed such that the thickness of the first end surface electrode is smaller than a thickness of the first external electrode on each of the bottom surface, the top surface, and the side surfaces, and the second external electrode is formed such that the thickness of the second end surface electrode is smaller than a thickness of the second external electrode on each of the bottom surface, the top surface, and the side surfaces.

8. The method of producing an electronic component according to claim 5, wherein the first external electrode and the second external electrode each comprise a resin electrode layer containing a conductive component and a resin component, and the resin electrode layer contains the conductive component in an amount of 67 wt % to 97 wt % and the resin component in an amount of 3 wt % to 33 wt %.

* * * * *